United States Patent [19]

Fernandez

[11] 4,211,541

[45] Jul. 8, 1980

[54] POLLUTION CONTROL SYSTEM

[75] Inventor: Alberto C. Fernandez, Mexico City, Mexico

[73] Assignee: Harry W. O. Kinnard, Arlington, Va.

[21] Appl. No.: 919,521

[22] Filed: Jun. 26, 1978

[51] Int. Cl.² .................... B01D 47/12; B01D 53/04
[52] U.S. Cl. ..................................... 55/68; 55/74; 55/94; 55/208; 55/316; 55/342; 423/210
[58] Field of Search .................... 55/68, 74, 85, 89, 93, 55/94, 98, 208, 222, 258, 259, 316, 342, 387; 423/210 R, 220, 231, 235, 246

[56] References Cited

U.S. PATENT DOCUMENTS

| | | | |
|---|---|---|---|
| 1,844,851 | 2/1932 | Harmon | 55/94 |
| 1,865,172 | 6/1932 | Cook | 261/DIG. 72 |
| 2,160,900 | 6/1939 | Pleasants | 423/210 R X |
| 3,261,147 | 7/1966 | Allander | 55/259 X |
| 3,668,833 | 6/1972 | Cahill, Jr. | 55/94 X |
| 3,672,126 | 6/1972 | Goettle | 55/259 X |
| 3,905,774 | 9/1975 | Kotting | 423/210 R X |
| 3,910,766 | 10/1975 | Kamada | 55/259 X |
| 3,923,955 | 12/1975 | Fattinger | 423/210 R |
| 4,040,803 | 8/1977 | Atsukawa et al. | 55/94 X |
| 4,123,506 | 10/1978 | Spevack | 423/210 R X |

*Primary Examiner*—Robert H. Spitzer
*Attorney, Agent, or Firm*—Robert E. Massa

[57] ABSTRACT

A pollution control system comprises method and apparatus for removing particulate and gaseous pollutants from combustion products. The method includes a series of physical and chemical treatments for combustion products. In one embodiment these steps are: passing combustion products through a screen to filter out large particles; washing combustion products with steam; passing combustion products through activated carbon; washing combustion products with a solution of potassium aluminum sulfate, aluminum sulfate, aluminum hydroxide, chlorine, and quicklime; washing combustion products with an aqueous solution of kerosene and naphthalene; and washing combustion products with a solution of aluminum hydroxide, aluminum sulfate, chlorine, quicklime, and sodium carbonate. The apparatus, which is adaptable to a combustion unit, comprises a boiler for steam generation; a mixing chamber for steam and combustion products adjacent the combustion unit and steam boiler; a filter between the mixing chamber and a filtration chamber, with the filtration chamber adaptable to contain activated carbon; a series of three combustion products washing members, each adaptable to wash combustion products with wash fluid, and each including means to circulate wash fluid and remove any solid matter from the wash fluid.

6 Claims, 7 Drawing Figures

POLLUTION CONTROL SYSTEM

BACKGROUND OF THE INVENTION

This invention relates to method and apparatus for removing particulate and gaseous pollutants from combustion products.

More particularly, this invention relates to method and apparatus for removing particulate and gaseous pollutants from combustion products by physical and chemical principles.

Still more particularly, this invention relates to method and apparatus for removing pollutants from combustion products which will retain the combustion products in a closed system for suitable recycling of cleaned air portion of combustion gases.

Combustion processes may generate many different types of air pollutants depending upon the reactants involved in the combustion reaction. These pollutants may include particulate matter, liquid products, and gaseous products, depending upon the various conditions of the combustion process. Particulate matter may include incompletely oxidized matter, inorganic combustion products, or solid material formed as a result of certain other combustion conditions. Liquids may also result from incomplete combustion, or from condensation of vaporized material in cooler portions of the combustion process, or as a result of reactions between gaseous combustion products. Gaseous combustion products will depend upon the reactants and the reaction conditions.

Thus, it is clear that any attempt to control air pollution must require a recognition that the pollutants resulting from the combustion process vary greatly depending upon the reactants and will vary greatly in a process where the reactants are the same, as the conditions change.

SUMMARY OF THE INVENTION

Therefore, the primary object of this invention is to provide method and apparatus for controlling pollution in a combustion process which will be efficient in operation, inexpensive, and easy to operate.

Another object of this invention is to provide method and apparatus for controlling pollution in a combustion process which will allow cleaned air to be recycled.

Still another object of this invention is to provide method and apparatus for control of pollution in a combustion process which will require only very small amounts of energy in operation.

Still another object of this invention is to provide method and apparatus for control of pollution which may be readily adaptable to either new or existing combustion process facilities.

Another object of this invention is to provide method and apparatus for control of pollution in a combustion process which will make efficient use of heat energy developed from the combustion process.

Another object of this invention is to provide method and apparatus for control of pollution in a combustion process which may be adaptable to operate as a substantially closed system.

Still another object of this invention is to provide method and apparatus for control of pollution in a combustion process which is adaptable to be modular in design.

These and other objects of the invention will become apparent from the accompanying description and drawings and attached claims which describe the invention as a method for control of pollution control system in which the method comprises a series of physical and chemical steps of treating combustion products, and the pollution control system comprises, in combination, apparatus adaptable to contain, circulate, and provide means for treating, the combustion products. The steps in the method of treating the combustion products include: screening, washing with steam, filtering through activated carbon, and washing with chemicals, including: potassium aluminum sulfate, aluminum sulfate, aluminum hydroxide, chlorine, quicklime, sodium carbonate, kerosene, and naphthalene.

The apparatus in the pollution control system, adaptable to communicate with a combustion chamber producing the combustion products, includes: a boiler for steam generation, a mixing chamber for steam and combustion products, a filter between the mixing chamber and a filtration chamber containing granulated carbon, a first combustion products washer downstream of the filtration chamber, a second combustion products washer downstream of the first combustion products washer, and a third combustion products washer downstream of the second combustion products washer, with each of the first, second, and third combustion products washers adaptable to wash combustion products with a different wash fluid and to filter the wash fluids and remove any solids from each. The apparatus includes means for cooling the various wash fluids, and includes means for recycling or venting the substantially cleaned air resulting from the treatment of the combustion products.

DESCRIPTION OF THE PREFERRED EMBODIMENT

The method and apparatus of a pollution control system according to this invention comprises a combination of apparatus adaptable to communicate with a combustion system and to receive and to treat the combustion products in a series of steps by physical and chemical means to remove the particulate and gaseous pollutants from the combustion products and to recycle to the combustion system or vent to the atmosphere cleaned air resulting from the treatment.

Figure 1:
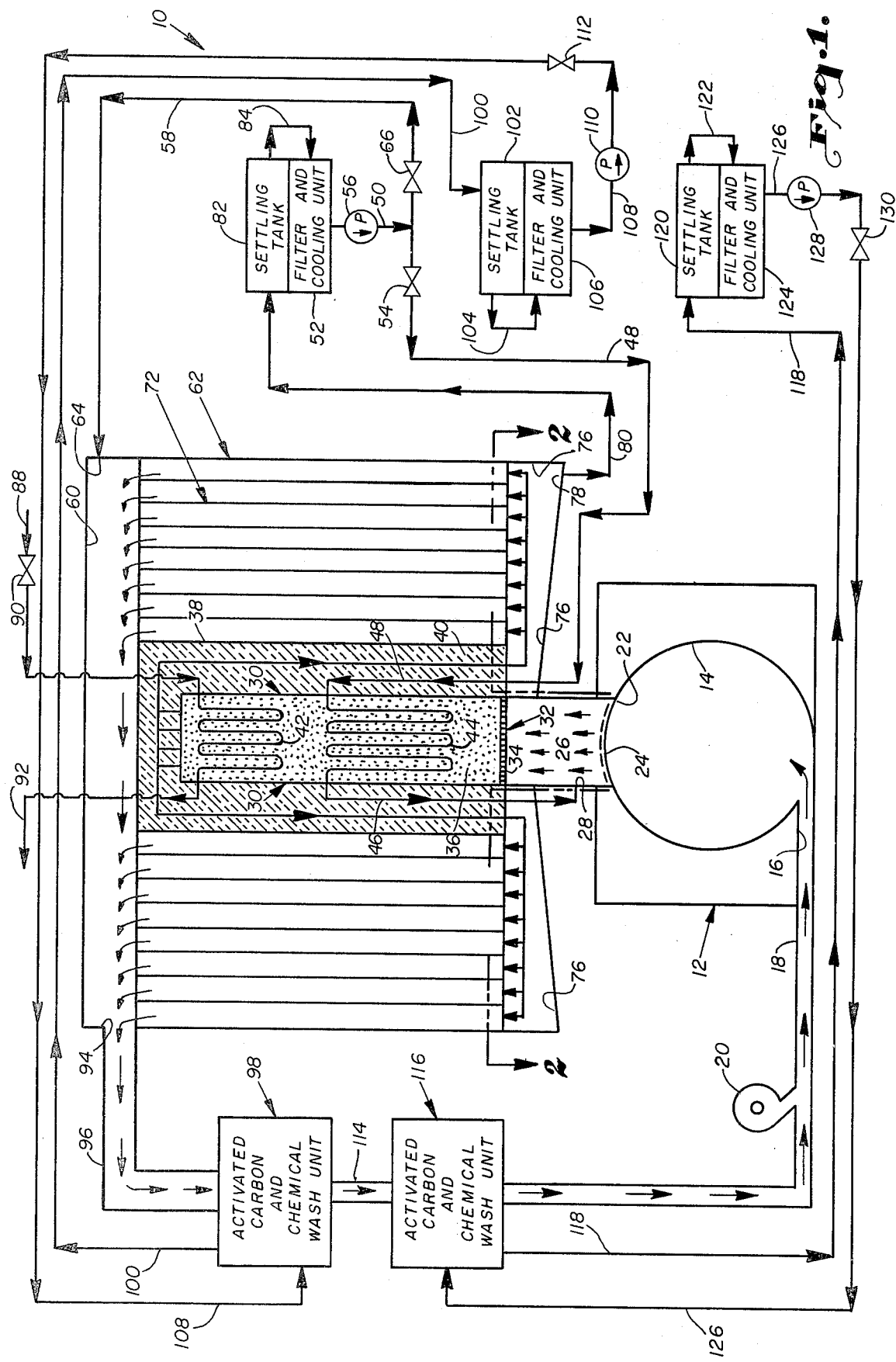
FIG. 1 is a schematic view of a pollution control system according to this invention.
Figure 2:
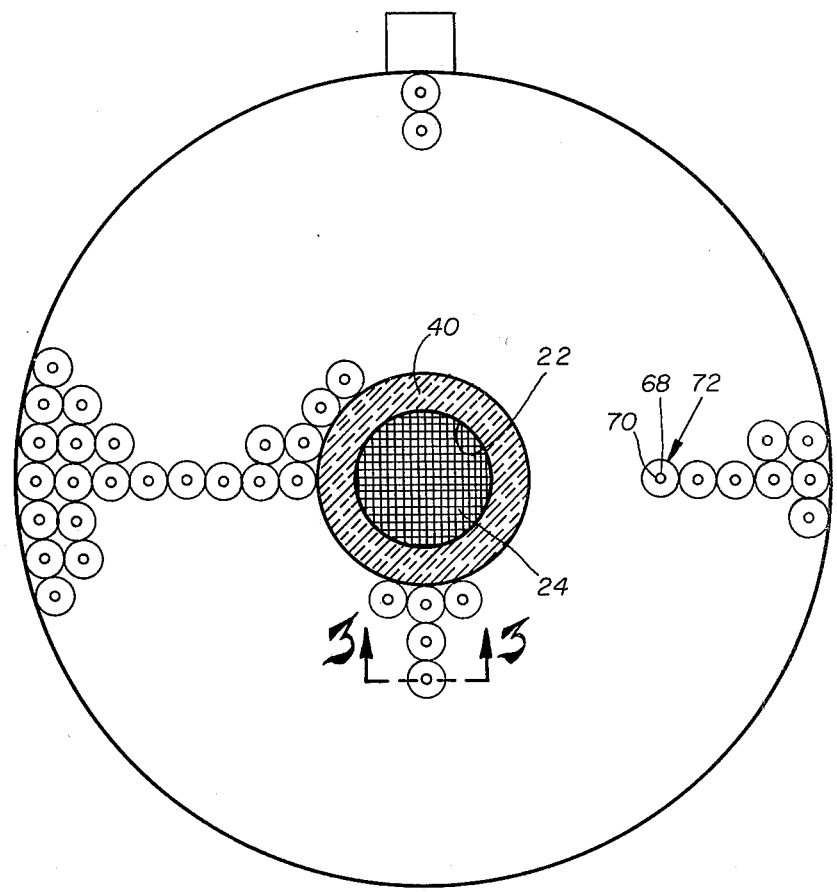
FIG. 2 is a sectional view of a portion of the apparatus according to this invention taken along the lines 2—2 of FIG. 1.
Figure 3:
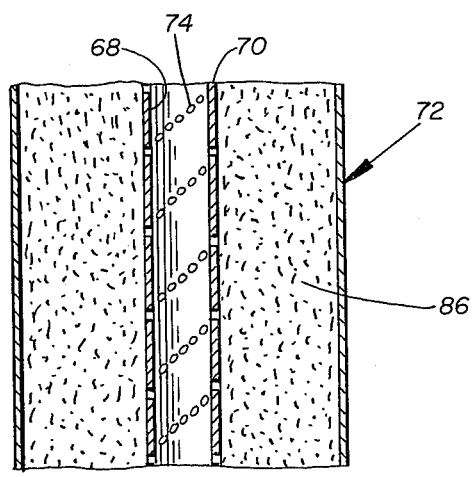
FIG. 3 is a partial sectional view of a tubular washer component taken along the lines 3—3 of FIG. 2.
Figure 4:
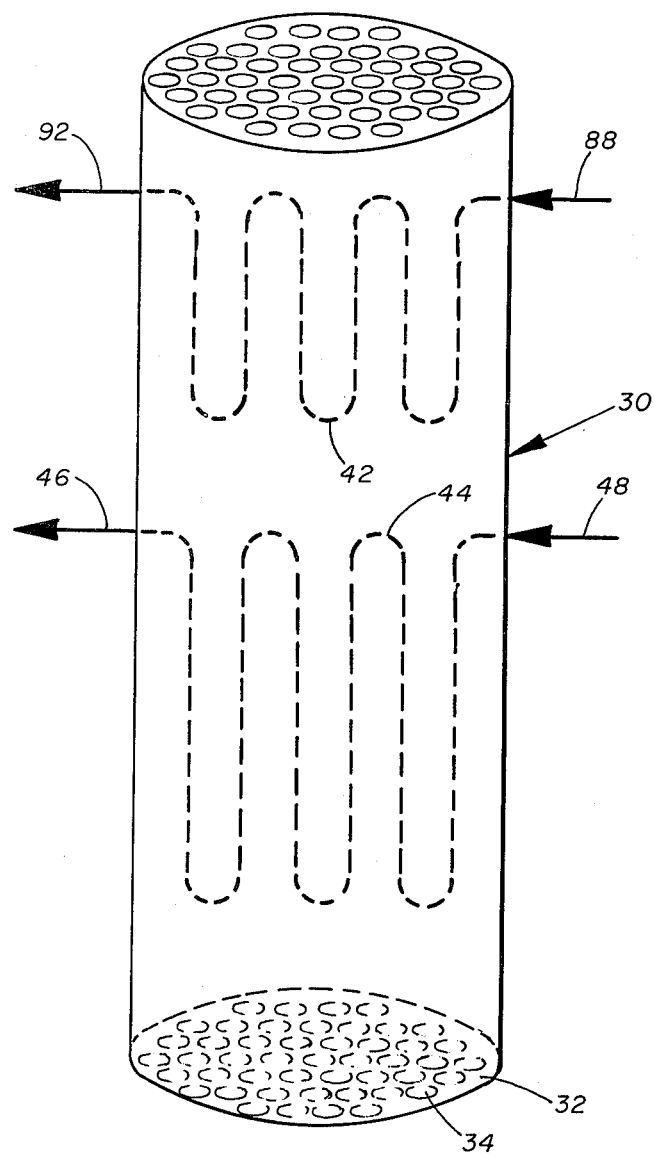
FIG. 4 is a perspective view of a filter member according to this invention.

FIG. 1 describes a schematic view of the pollution control system according to this invention and diagrammatically indicates the flow of the combustion products and chemical treatment fluids.

A pollution control system 10, generally, according to this invention, is adaptable to a typical combustion unit 12, generally, which has a combustion chamber 14, an air inlet 16, and a conventional fuel inlet (not shown). Air inlet 16 is adaptable to allow outside air to enter the combustion chamber 14 or to allow cleaned air to be recycled into combustion chamber 14 from line 18 after having been treated as will be described hereinafter. This recycled air, as well as the flow of combustion products throughout the system, is aided by action of a conventional blower 20. Other blowers may be added in other parts of the system as needed to help the flow of gases. An outlet 22 of the combustion chamber 14 is fitted with a metallic screen filter member 24 to filter particulate matter from combustion products emitting from combustion chamber 14. Thus, large particulate matter is returned to the combustion chamber 14 and much smaller particulate matter and gaseous components pass through filter member 24 to receive further treatment in the system.

Large particulate matter accumulating in combustion chamber 14 may then be removed by any suitable conventional means.

Adjacent to combustion chamber 14 and communicating with outlet 22 is an enclosed compartment which may be described as mixing chamber 26 wherein combustion products passing through screen 24 can be mixed with fluid which has been heated in another part of the apparatus and passed into mixing chamber 26 through inlet 28. Located preferably above mixing chamber 26 is filtration chamber 30, generally, having a perforated plate 32 at its lower end having therein small perforations 34 allowing for passage of gaseous combustion products and any small particulate matter which passes through screen 24. Filtration chamber 30 contains activated carbon particles 36, granulated of a suitable size, to provide a further means for removal of pollutants by filtration or adsorption according to whichever principle the particular pollutants may react.

As described in FIG. 1, filtration chamber 30 is enclosed within a compartment 38 which contains asbestos material 40 to retain heat within filtration chamber 30 and to make more efficient the generation of steam in boiler pipes 42 and 44 as a use of the heat of combustion of the system. Then, steam from boiler pipes 44 passes through line 46 connected to inlet 28. The inlet side of boiler pipes 44 is connected to line 48 which is further connected to line 50 connected to filter and cooling unit 52. Line 48 includes a valve member 54 allowing proper control of fluid through line 48 as desired.

Line 50 includes a pump 56 to provide suitable pressure to fluid flowing from filter and cooling unit 52 through line 48 and also through line 58 connected to upper space 60 of body 62, generally, having inlet 64 for line 58. Line 58 includes valve 66 allowing proper control of wash fluid through line 58 as desired. A suitable spray system may be installed in upper space 60, communicating with inlet 64 to give a desirable spread of wash fluid throughout upper space 60. Wash fluid then flows downwardly through a central longitudinal passage 68 in each central tubular compartment 70 of each tubular member 72, generally, as more specically described in FIGS. 2, 3, 6, and 7. As wash fluid flows downwardly through passage 68, it contacts and may react with gaseous combustion products entering central passage 68 through openings 74. Central tubular compartment 70 is connected to and communicates with lower space 76 in body 62, then to be recycled through outlet 78 and line 80 to settling tank 82.

After a portion of the solid material has settled out of the wash fluid, the supernatant fluid flows through line 84 to filter and cooling unit 52. As filter material, tubular member 72 is preferably filled with granulated activated carbon, and filter and cooling unit 52 is preferably filled with sand (not shown).

Filter and cooling unit 52 contains a conventional set of cooling members, such as refrigeration pipes, (not shown) in order to give proper cooling, as desired, to the wash fluid passing through filter and cooling unit 52. Also attached to or made a part of filter and cooling unit 52, but not shown, is means to remove saturated filter material, as saturated sand, and means to remove, add to, or reconstitute, the wash fluid as needed. It should be noted that each filter unit in the system should have means of access to the filter material and wash fluid, as needed, means for cooling the wash fluid to a desired temperature.

Also, each settling tank in the system, as settling tank 82, should have means for removal of solid pollutants which have settled out of the particular wash fluid.

Boiler pipes 42 are attached to inlet line 88 to permit flow of water from an outside source controlled by valve 90 to develop steam for use in this particular system or any outside industrial system as needed by connection to outlet line 92.

Combustion products passing from upper space 60 through outlet 94 pass through duct 96 and enter activated carbon and chemical wash unit 98, generally, described schematically in FIG. 1, which is preferably a combination of apparatus similar to that already described for the filtration and chemical washing of the combustion products but with different chemicals as hereinafter described. Of course, with substantial removal of many pollutants in the apparatus already described in detail, it may not be necessary to include as much apparatus in the unit 98.

After providing suitable treatment in the apparatus of unit 98, the wash fluids of that apparatus pass through line 100 to settling tank 102, which is similar to settling tank 82. Here, any solid matter settles out and the supernatant wash fluid passes through line 104 to filter and cooling unit 106, which, again, is preferably a sand filter chamber containing therein suitable cooling pipes as needed. The cooled wash fluid passes through line 108, pump 110, and valve 112 to be recycled to unit 98.

Then, the further treated combustion products pass through duct 114 to another similar activated carbon and chemical wash unit 116, generally, which also is shown schematically in FIG. 1, but which is also preferably another combination of apparatus similar to that already described in detail above for the treatment of the combustion products. Unit 116 provides a chemical wash treatment described specifically below. After treatment of the combustion products, the wash fluid for this unit passes through line 118 to another settling tank 120, where, again, any solids settle out and the supernatant wash fluid passes through line 122 to filter and cooling unit 124. This, again, is preferably a sand filter which contains suitable cooling pipes. The cooled wash fluid then passes through line 126, through pump 128, and valve 130, to be recycled to unit 116. After treatment in unit 116 the remaining combustion products, which are substantially cleaned air, flow through line 18 to combustion chamber 14, or may be vented to the atmosphere or otherwise used.

Figure 5:
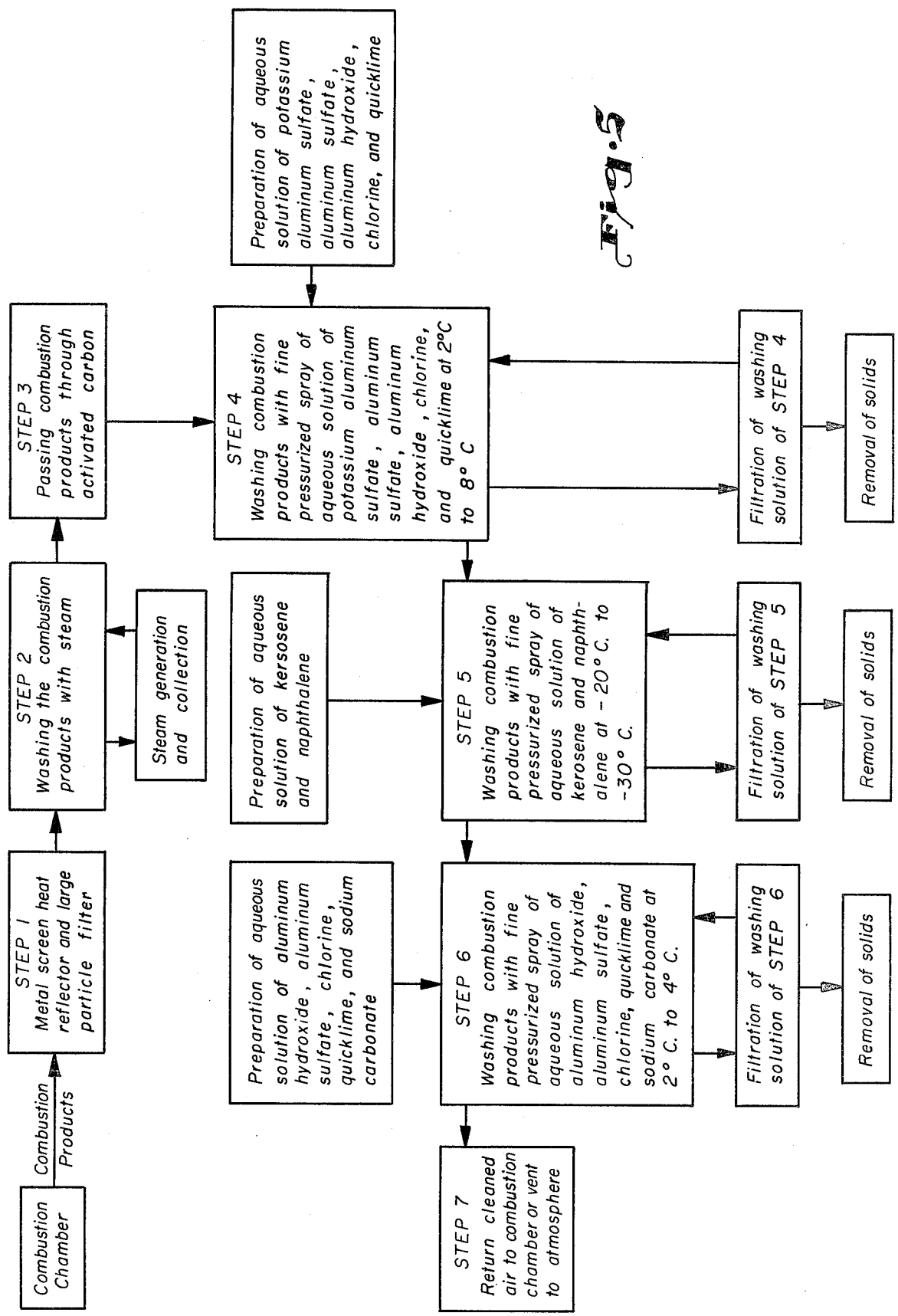
FIG. 5 is a diagram of the steps in the method of treating combustion products according to this invention.
Figure 6:
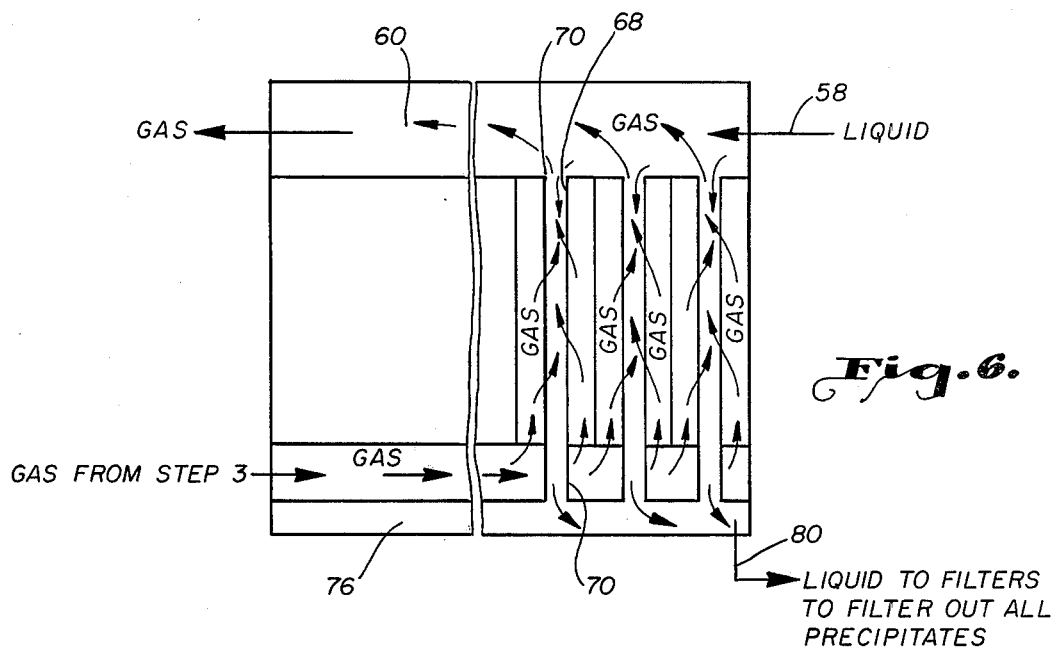
FIG. 6 is a schematic view of a portion of a tubular washer apparatus of the pollution control system according to this invention describing the flow of gaseous combustion products and wash fluid.
Figure 7:
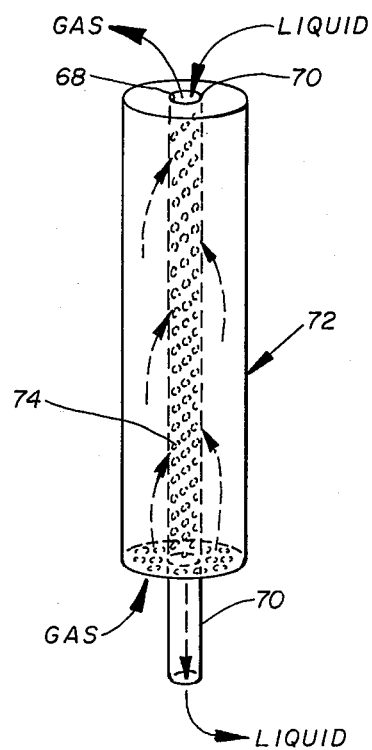
FIG. 7 is a perspective view of a single tubular washer component as described schematically in FIG. 6, further describing the flow of gaseous combustion products and wash fluid.

The method of my invention comprises a series of steps as outlined diagrammatically in FIG. 5 in which each step may be related to a particular portion of the apparatus already described for ease in understanding. FIG. 5 describes the various chemicals, generally, and conditions found beneficial in each step.

The steps of the method, and the chemicals and conditions chosen for each step, are known, by experience, to provide for removal of pollutants from any common material under extreme conditions of combustion reaction. The reactions of combustion products with the chemical formulations presented in each step follow the usual predictable laws of chemistry and physics. Temperatures present in the combustion process, and subsequent catalytic capabilities of activated carbon, may cause components of the combustible material to be brought to the most highly oxidized state, such as oxides and carbon dioxide. And, temperatures of the various wash fluids, and composition of the various wash fluids, may readily dissolve many of the combustion products.

The physical reactions of steps 1, 2, and 3, as outline in FIG. 5 are readily understandable, wherein large particles of the combustion products are removed from the total combustion product composition, or other components are washed by steam from the combustion products, or adsorbed on activated carbon. For steps 4, 5, and 6, I have found particular chemical components, proportions, and temperatures of reaction to be especially effective in removing pollutants.

In step 4, to 10 liters of water, I add, and maintain, as the efficiency of the reaction indicates: 250 grams potassium aluminum sulfate [$KAl(SO_4)_2 \cdot 12H_2O$], 200 grams aluminum sulfate [$Al_2(SO_4)_3 \cdot 18H_2O$], 175 grams aluminum hydroxide [$Al(OH)_3 \cdot 18H_2O$], 50 grams quicklime [$CaO$], and 2 ounces chlorine gas [$Cl_2$]. This composition is proportionate to the size of the apparatus with which it is used, as is the case with the other formulations. This formula is especially effective in dissolving any nitrogen oxides, carbon monoxide, carbon dioxide, formaldehyde, etc.

Step 5 comprises a saturated aqueous solution of kerosene (predominantly $C_{10}$–$C_{16}$ hydrocarbons), and naphthalene.

In step 6, for every 10 liters of water, I add and maintain: 200 grams aluminum sulfate [$Al_2(SO_4)_3 \cdot 18H_2O$], 175 grams aluminum hydroxide [$Al(OH)_3 \cdot 18H_2O$], 50 grams quicklime [$CaO$], 50 grams sodium carbonate [$Na_2CO_3$], and 2 ounces chlorine gas [$Cl_2$].

The temperatures found most favorable for each of these wash fluids are denoted in FIG. 5.

Since many different embodiments of this invention may be made without departing from the spirit and scope thereof, it is to be understood that the specific embodiments described in detail herein are not to be taken in a limiting sense, since the scope of the invention is best defined by the appended claims.

I claim:

1. A method of treating combustion products to remove gaseous and solid polluting components comprising the steps in order of:
    passing the combustion products through a screen to allow gases and particles of smaller size than mesh size to pass through the screen while retaining particles larger than mesh size in the combustion area, then
    washing combustion products with steam, then
    passing a mixture of steam and combustion products through granulated carbon, then
    washing combustion products with an aqueous solution of potassium aluminum sulfate, aluminum sulfate, aluminum hydroxide, chlorine, and quicklime, and removing any precipitants, then
    washing combustion products with an aqueous solution of kerosene and naphthalene and removing any precipitants, and then
    washing combustion products with an aqueous solution of aluminum hydroxide, aluminum sulfate, chlorine, quicklime, and sodium carbonate, and removing any precipitants.

2. A method of treating combustion products to remove gaseous and solid polluting components as described in claim 1 wherein the steps of washing the combustion products with various aqueous solutions include using cooled aqueous solutions.

3. A method of treating combustion products to remove gaseous and solid polluting components as described in claim 2 wherein:
    the step of washing the combustion products with an aqueous solution of potassium aluminum sulfate, aluminum sulfate, aluminum hydroxide, chlorine, and quicklime is within a temperature range of 2° Centigrade to 8° Centigrade,
    the step of washing the combustion products with an aqueous solution of kerosene and naphthalene is within a temperature range of −20° Centigrade to −30° Centigrade, and
    the step of washing the combustion products with an aqueous solution of aluminum hydroxide, aluminum sulfate, chlorine, quicklime, and sodium carbonate is within a temperature range of 2° Centigrade to 4° Centigrade.

4. A method of treating combustion products to remove polluting components comprising the step of:
    washing combustion products with an aqueous solution of potassium aluminum sulfate, aluminum sulfate, aluminum hydroxide, chlorine, and quicklime.

5. A method of treating combustion products to remove polluting components as described in claim 4 which is followed by the step of:
    washing combustion products with an aqueous solution of kerosene and naphthalene.

6. A method of treating combustion products to remove polluting components as described in claim 5 which is followed by the step of:
    washing combustion products with an aqueous solution of aluminum hydroxide, aluminum sulfate, chlorine, quicklime, and sodium carbonate.

* * * * *